United States Patent
Kim

(10) Patent No.: US 10,101,594 B2
(45) Date of Patent: Oct. 16, 2018

(54) OPTICAL IMAGE STABILIZATION STRUCTURE AND CAMERA MODULE HAVING THE SAME

(71) Applicants: ACTRO CO., LTD., Gyeonggi-do (KR); ENEBRAIN CO., LTD., Gyeonggi-do (KR)

(72) Inventor: Jong-cheol Kim, Gyeonggi-do (KR)

(73) Assignees: ACTRO CO., LTD., Yongin-si (KR); ENEBRAIN CO., LTD., Suwon-si (KR)

( * ) Notice: Subject to any disclaimer, the term of this patent is extended or adjusted under 35 U.S.C. 154(b) by 92 days.

(21) Appl. No.: 15/387,010

(22) Filed: Dec. 21, 2016

(65) Prior Publication Data

US 2017/0176768 A1    Jun. 22, 2017

(30) Foreign Application Priority Data

Dec. 22, 2015   (KR) .......................... 10-2015-0184141

(51) Int. Cl.
*G02B 27/64*    (2006.01)

(52) U.S. Cl.
CPC .................................. *G02B 27/646* (2013.01)

(58) Field of Classification Search
None
See application file for complete search history.

(56) References Cited

U.S. PATENT DOCUMENTS

| 2009/0052037 A1* | 2/2009 | Wernersson | G02B 27/646 359/554 |
| 2015/0253583 A1* | 9/2015 | Cho | G02B 13/0015 348/360 |
| 2015/0346507 A1* | 12/2015 | Howarth | G03B 3/10 359/557 |
| 2016/0299312 A1* | 10/2016 | Cho | G02B 7/08 |
| 2017/0176768 A1* | 6/2017 | Kim | G02B 27/646 |

FOREIGN PATENT DOCUMENTS

KR    10-2014-0077301 A    6/2014

* cited by examiner

*Primary Examiner* — W B Perkey
(74) *Attorney, Agent, or Firm* — Stein IP, LLC

(57) ABSTRACT

Disclosed is an optical image stabilization (OIS) structure that prevents camera shake occurring in a smartphone camera, and a camera module having the same. The OIS structure includes: a base housing provided with an OIS coil; a lens housing disposed over the base housing to be apart therefrom; and an OIS leaf spring for allowing the base housing and the lens housing to be elastically coupled to each other.

20 Claims, 16 Drawing Sheets

3 # OPTICAL IMAGE STABILIZATION STRUCTURE AND CAMERA MODULE HAVING THE SAME

CROSS REFERENCE TO RELATED APPLICATION

The present application claims priority to Korean Patent Application No. 10-2015-0184141, filed Dec. 22, 2015, the entire contents of which is incorporated herein for all purposes by this reference.

BACKGROUND OF THE INVENTION

Field of the Invention

The present invention generally relates to an optical image stabilization (OIS) structure and a camera module having the same. More particularly, the present invention relates to an optical image stabilization (OIS) structure, which allows easy assembly, precise correction of camera shake, and has good resistance to shocks, and a camera module having the same.

Description of the Related Art

Recently, an ultra compact camera module for a mobile device has been widely used. An ultra compact camera for a mobile device is required to have a high number of pixels, a zoom function, an autofocus (AF) function, etc. according to consumer needs.

As the camera module has a high number of pixels and a size of the individual pixels is reduced, an image captured by an image sensor is out of focus due to even light camera shake at the time when a shutter of a camera or a mobile device is operated, whereby image quality is lowered and it is impossible to obtain a clear photograph.

Deterioration of image quality resulting from the camera shake is caused when light passing through a lens of an optical system does not correspond to an optic axis of the lens. Accordingly, to avoid this, the lens is moved in a direction perpendicular to the optic axis such that the optic axis corresponds to an incident path of the light, or the image sensor is moved in a direction perpendicular to the optic axis such that the camera shake is corrected.

FIG. 1 is an exploded perspective view showing a conventional camera module that provides a shake correction function; and FIG. 2 is a schematic sectional view showing the conventional camera module. The conventional camera module having the shake correction function includes: a sensor circuit board 110 with an image sensor 111 being provided therein; a base housing 120 provided in the sensor circuit board 110; an optical system 150 accommodated in the base housing 120; an optical image stabilization (OIS) actuator 140 for compensating for displacement caused by shaking of the optical system 150; a suspension wire 160 for supporting the optical system 150; and a shield case 170 for covering an upper portion of the base housing 120. The optical system 150 includes a lens barrel 151 and a lens housing 152, wherein the lens barrel 151 is inserted into the center of the lens housing 152. The conventional camera module is configured such that when camera shake occurs while a user takes a photograph using a camera, a displacement sensor 145 senses the camera shake and the OIS actuator 140 including an electromagnet is operated to compensate for the shaking by moving in a direction opposite to the camera shake, thereby correcting the camera shake.

The OIS actuator 140 includes an OIS coil 141 and a magnet 143. A flexible printed circuit board 142 provided with the OIS coil 141 is locked to the base housing 120. A yoke 144 provided with magnet 143 is locked inside the optical system 150. The two displacement sensors 145 are provided in the base housing 120 to reduce x-axis and y-axis displacement when camera shake occurs.

The conventional camera module is configured such that the optical system 150 is locked to the base housing 120 by two suspension wires 160 or four wire springs. The optical system 150 is point-contacted by the wires to be elastically coupled to the base housing 120, thereby freely moving within a predetermined range over the base housing 120. FIG. 3 is a perspective view showing a state where the suspension wire is engaged with an accommodation groove 153, in the conventional camera module shown in FIG. 1. As shown in FIGS. 1 and 3, the suspension wire 160 is inserted into holes 154 provided in the optical system 150, then locked at locations of a1, a2, a3, and a4 in an upper portion of an outer surface of the optical system by using an adhesive, and locked to the base housing 120 at locations of b1, b2, b3, and b4 by using the adhesive. Consequently, the conventional camera module is configured such that the optical system 150 and the base housing 120 are elastically coupled to each other at four edges by the wires (w1, w2, w3, and w4). However, this coupling structure using wires is problematic for the following reasons.

Firstly, since the suspension wire 160 is inserted into the optical system 150 by hand but the diameter is too small to be easily seen, it may be broken during assembly with the optical system, and accordingly, production yield may be decreased.

Secondly, it is difficult to process camera shake compensation. In the case of using the suspension wire (or a wire spring) in the conventional camera module, since an annular wire having a small diameter is used, a force is distributed in all directions whereby the wire moves in a y-axis direction even though it is controlled to move in only an x-axis direction. Accordingly, in using the conventional suspension wire (or the wire spring), movement should be controlled in a direction of 45 degrees for movement compensation, thereby causing inconvenience.

Reference will be made to the above mentioned problems, with reference to FIG. 4. FIG. 4 is a schematic top plane view showing a coupling structure between the optical system and the suspension wire, in the conventional camera module shown in FIG. 3. In the case of using four wires (w1, w2, w3, and w4) as shown in FIG. 4, even when a force is exerted in an x-axis direction, the force is distributed in a y-axis direction, whereby movement also occurs in the y-axis direction. Accordingly, in the case of wire coupling, movement should be controlled in a direction of 45 degrees, which is marked with a first direction d1 and a second direction d2, in order to efficiently control the camera shake correction. In the conventional smartphone, respective movement amounts in the x-axis direction and the y-axis direction by camera shake are sensed by using the displacement sensor, and the movement amounts should be converted into movement that allows compensation in the direction of 45 degrees, whereby conversion error occurs, which leads inaccurate compensation.

Lastly, in the case of wire coupling, when the smartphone is dropped on the floor, a shock is exerted in a z-axis direction, whereby one axis of the suspension wire (or the wire spring) supporting the optical system may be deformed, and the shake correction function may be deteriorated or the optical system may be inclined in one direction. Further, when the wire is broken by shock, it is impossible to provide the shake correction function itself. To avoid this, the diameter of the suspension wire (or the wire spring) may be increased to increase yield stress. However, when the diameter of the suspension wire is increased, spring rigidity is increased in a direction perpendicular to the optic axis, whereby driving performance in camera shake correction may be lowered, and the entire size of the smartphone may be increased because a size of a driving member is increased.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose an optical image stabilization (OIS) structure and a camera module having the same, whereby the optical image stabilization (OIS) structure allows for easy assembly, is capable of separately compensating for movement caused by camera shake in respective x-axis and y-axis directions, and has excellent rigidity in a z-axis direction.

In order to achieve the above object, according to some aspects of the present invention, there is provided an OIS structure including: a base housing provided with an OIS coil; a lens housing disposed over the base housing to be apart therefrom; and an OIS leaf spring for allowing the base housing and the lens housing to be elastically coupled to each other, wherein the OIS leaf spring includes: an upper coupling portion coupled to a front surface of the lens housing; a lower coupling portion coupled to a front surface of the base housing; and a free portion provided by extending from the upper coupling portion to the lower coupling portion without being in contact with the base housing and the lens housing, wherein the free portion includes: a front portion provided in parallel with the front surfaces of the lens housing and the base housing; and a side portion provided by being bent from the front surface of the lens housing so as to extend in parallel with side surfaces of the lens housing and the base housing.

Herein, the front portion of the free portion includes: an upper front portion provided in parallel with the front surface of the lens housing; and a lower front portion provided apart from the upper front portion, and being in parallel with front surface of the base housing. The side portion of the free portion includes: an upper side portion connected to the upper front portion, and being in parallel with the side surface of the lens housing; and a lower side portion spaced apart from the upper front portion, connected to the lower front portion, and being in parallel with the side surface of the base housing. It is preferred that the free portion further includes a vertical portion connecting the upper side portion with the lower side portion, wherein the vertical portion is provided with at least one bent portion so as to absorb a shock when a smartphone freely falls.

Herein, the upper coupling portion of the OIS leaf spring includes a first upper bonding portion fixed to the lens housing by an adhesive; and the lower coupling portion includes a first lower bonding portion fixed to the base housing by the adhesive.

The upper coupling portion includes: the first upper bonding portion and a second upper bonding portion fixed to the lens housing by the adhesive; and an upper contact portion connecting between the first upper bonding portion and the second upper bonding portion, and coupled to the front surface of the lens housing. The lower coupling portion includes: the first lower bonding portion and a second lower bonding portion fixed to the base housing by the adhesive; and a lower contact portion connecting between the first lower bonding portion and the second lower bonding portion, and coupled to the front surface of the base housing. The first upper bonding portion and the second upper bonding portion are respectively provided on left and right sides based on a center of the front surface of the lens housing; and the first lower bonding portion and the second lower bonding portion are respectively provided on left and right sides based on a center of the front surface of the base housing.

The front surface of the lens housing includes a first coupling protrusion coupled to the upper contact portion; and the front surface of the base housing includes a second coupling protrusion coupled to the lower contact portion.

Here, a width of a bent portion of the leaf spring is configured to be wider than that of the upper coupling portion and/or the lower coupling portion of the leaf spring.

In order to achieve the above object, according to some aspects of the present invention, there is provided an OIS structure including: a base housing provided with an OIS coil; a lens housing disposed over the base housing to be apart therefrom; a first OIS leaf spring elastically coupled to front surfaces of the base housing and the lens housing; and a second OIS leaf spring elastically coupled to back surfaces of the base housing and the lens housing, wherein the first OIS leaf spring includes: an upper coupling portion coupled to a front surface of the lens housing; a lower coupling portion coupled to a front surface of the base housing; and a free portion provided by extending from the upper coupling portion to the lower coupling portion without being-contact with the base housing and the lens housing, wherein the free portion includes: a front portion provided in parallel with the front surfaces of the lens housing and the base housing; and a side portion provided by being bent from the front surface of the lens housing so as to extend in parallel with side surfaces of the lens housing and the base housing.

The front portion of the free portion includes: an upper front portion provided in parallel with the front surface of the lens housing; and a lower front portion provided apart from the upper front portion, and being in parallel with front surface of the base housing. The side portion of the free portion includes: an upper side portion connected to the upper front portion, and being in parallel with the side surface of the lens housing; and a lower side portion spaced apart from the upper front portion, connected to the lower front portion, and being in parallel with the side surface of the base housing. It is preferred that the free portion further includes a vertical portion connecting the upper side portion with the lower side portion, wherein the vertical portion is provided with at least one bent portion.

Here, a width of a portion of the leaf spring is configured to be wider than that of the coupling portion of the leaf spring.

In order to achieve the above object, according to some aspects of the present invention, there is provided a camera module including an image sensor, a lens barrel, and the above mentioned OIS structure.

The OIS structure applied to the camera module the according to the present invention is advantageous in that since the leaf spring having a predetermined width is used to couple the OIS structure, it is easier to handle the leaf spring than the conventional wire. Accordingly, it is possible to increase production yield thanks to easy assembly.

The OIS structure applied to the camera module according to the present invention is further advantageous in that since the OIS structure has an elastic coupling structure by the leaf spring, and bent portions that are bent toward neighboring surfaces, the bent portions serve as a fixed point. Accordingly, it is possible to separately control respective movements in the x-axis direction and the y-axis direction.

The OIS structure applied to the camera module according to the present invention is further advantageous in that since a connection portion of the leaf spring formed in a z-axis direction has almost an infinite modulus of elasticity, it is possible to provide good resistance to shocks even when a strong external shock is applied, for example, when a smartphone is dropped down.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It will be understood that when an element is referred to as being "on" another element, it can be on or beneath the other element, which is not always based on the direction of gravity. It will be further understood that when an area or a substrate is referred to as being "on", another area or substrate, it can be directly on the other area or substrate or intervening area or the substrate may be present therebetween.

It will be understood that when an element is referred to as being "coupled" or "connected" to another element, it can be directly coupled or connected to the other element or intervening elements may be present therebetween.

It will be further understood that, although the terms first, second, etc. may be used herein to describe various elements, these elements should not be limited by these terms.

Hereinafter, a preferred embodiment of the present invention will be described in detail with reference to the attached drawings.

Figure 1:
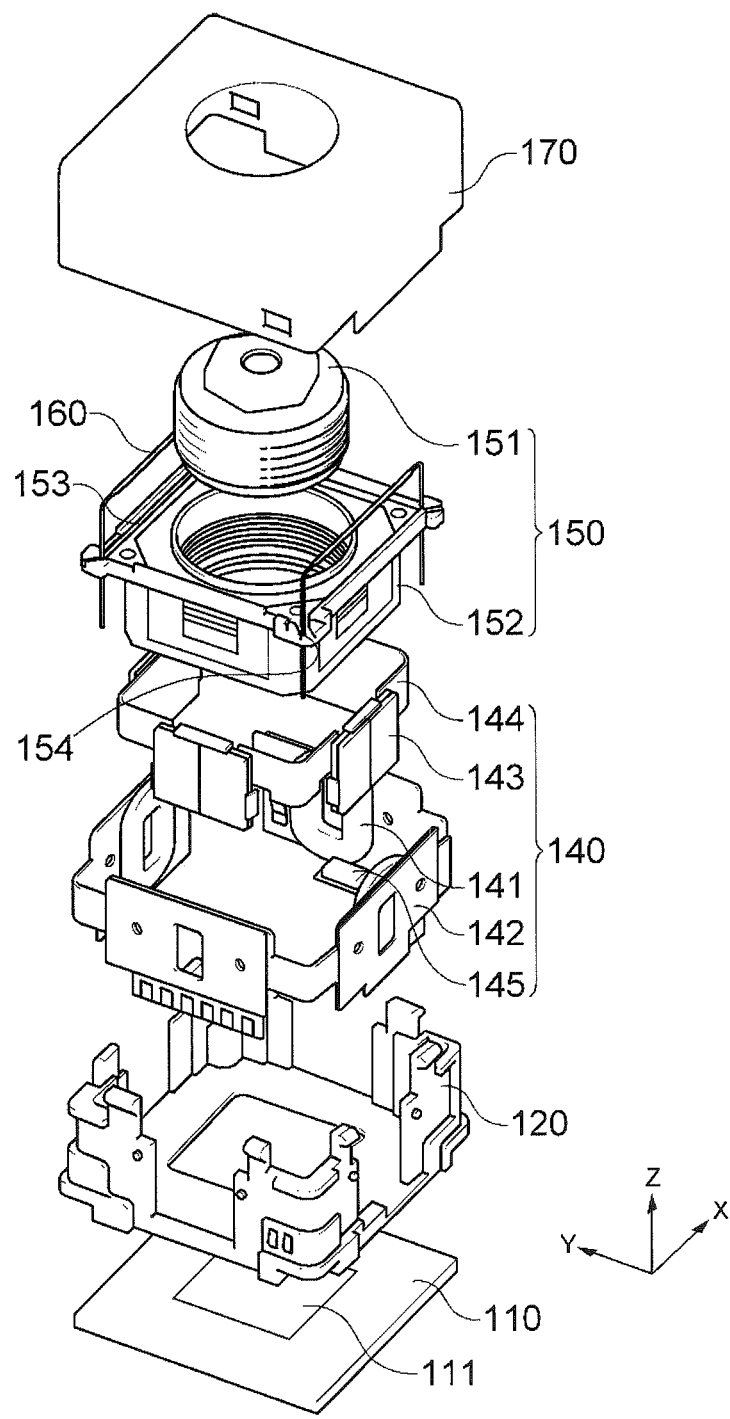
FIG. 1 is an exploded perspective view showing a conventional camera module that provides a shake correction function.
Figure 2:
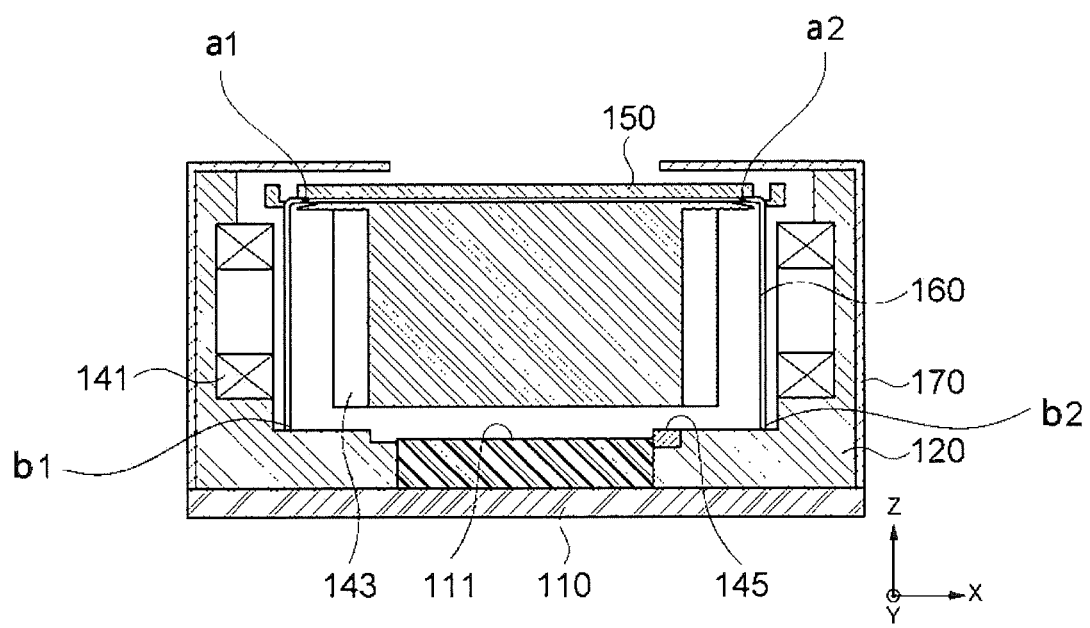
FIG. 2 is a schematic sectional view showing the conventional camera module.
Figure 3:
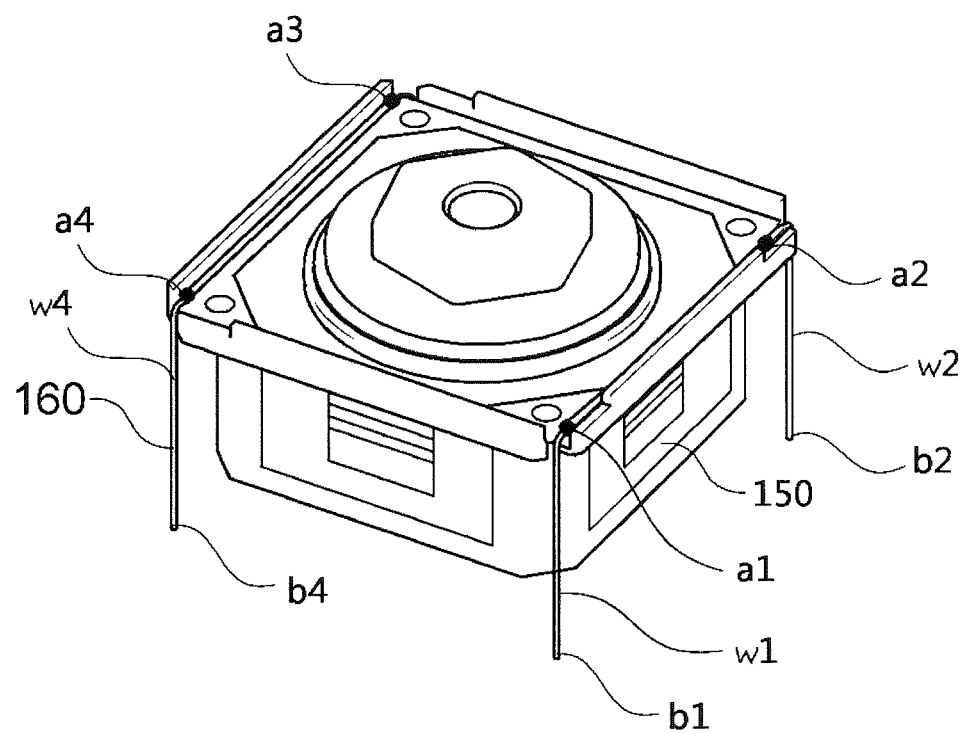
FIG. 3 is a perspective view showing a state where a suspension wire is engaged with an accommodation groove, in the conventional camera module shown in FIG. 1.
Figure 4:
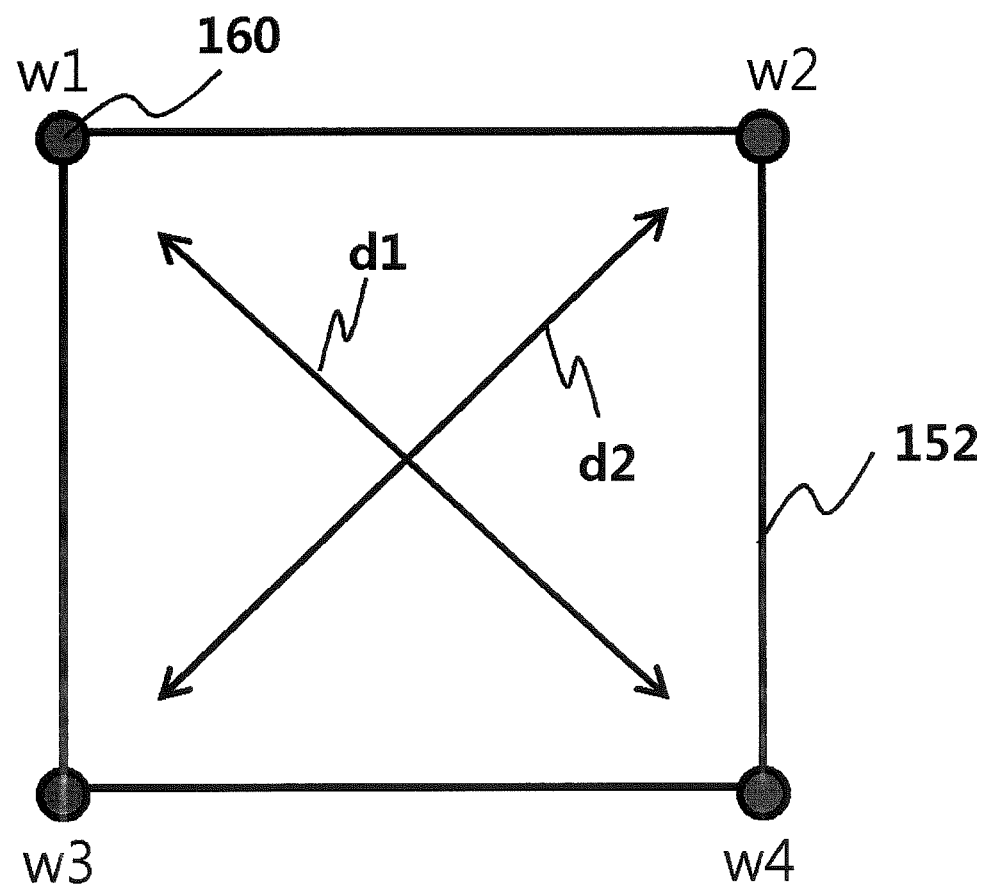
FIG. 4 is a schematic top plane view showing a coupling structure between an optical system and the suspension wire, in the conventional camera module shown in FIG. 3.
Figure 5:
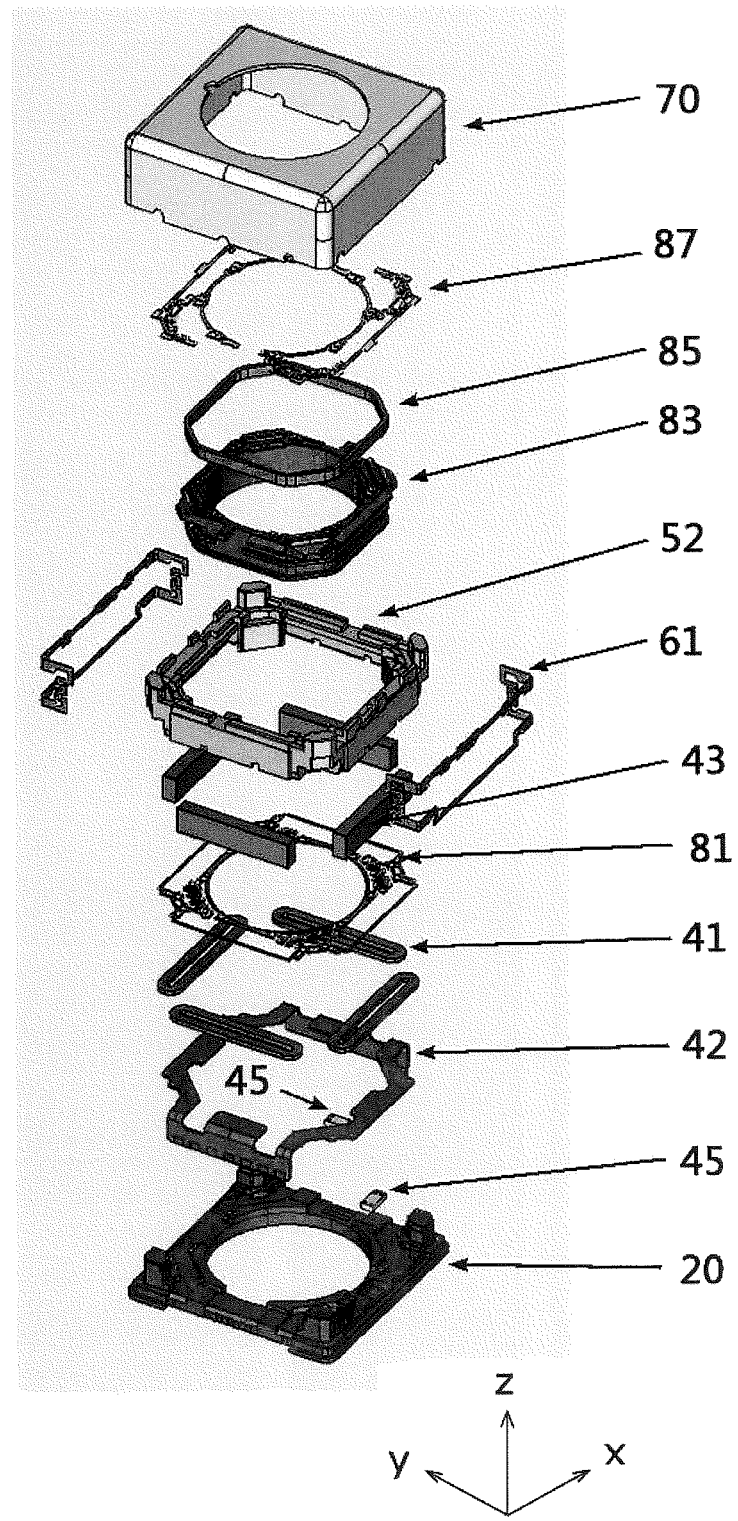
FIG. 5 is an exploded perspective view showing a camera module according to the present invention.

FIG. 5 is an exploded perspective view showing a camera module according to the present invention. The camera module shown in FIG. 5 is provided with an autofocus (AF) module that provides an autofocus function, and in FIG. 5, an image sensor, a circuit board having the image sensor, and a lens barrel are not shown, for convenience of description.

Reference will be made to a configuration of the camera module according to the present invention. The camera module is provided with a sensor circuit board (not shown) having an image sensor (not shown). The sensor circuit board is provided with the image sensor (not shown), and two displacement sensors 45 for respectively measuring x-axis and y-axis displacement amounts, wherein a base housing 20 is provided on the sensor circuit board. The base housing 20 is fixedly provided with a flexible printed circuit board 42 having an optical image stabilization (OIS) coil 41. An outer surface of the base housing 20 is coupled to lower portions of two OIS leaf springs 61; and upper portions of the OIS leaf springs 61 are coupled to a lens housing 52. Thanks to the OIS leaf springs 61, the lens housing 52 has a coupling structure that freely moves in x-axis and y-axis directions within a predetermined range over the base housing 20. Each inner side surface of the lens housing 52 is fixedly provided with one magnet 43. A bottom surface of each magnet 43 is disposed at a location corresponding to the OIS coil 41. A bobbin 83 with an autofocus (AF) coil 85 being wound around an outer side surface thereof is provided in a center of the lens housing 52; and the lens housing 52 coupled to the bobbin 83 is provided with an AF upper spring 87 and an AF lower spring 81 respectively at an upper portion and a lower portion thereof. The AF coil 85 is provided at a location corresponding to an inner side surface of the magnet 43. The AF lower spring 81, the AF coil 85, the bobbin 83, and the AF upper spring 87 are provided for an autofocus function, all of which have nothing to do with an optical image stabilization (OIS) function that the present invention discloses, so a detailed description thereof will be omitted. By applying electromagnetic force to the bottom surface of the magnet 43 that is fixedly provided in the lens housing 52, by using the OIS coil 41, the lens housing 52 is moved toward an x-axis and an y-axis so as to correct camera shake. A side surface of the magnet 43 serves to move the bobbin 83 toward a z-axis by using magnetic force outputted from the AF coil 85, thereby performing the autofocus function. An outermost side of the camera module is covered with a shield case 70.

An optical image stabilization (OIS) structure disclosed in the present invention has a coupling structure including the base housing 20, the OIS coil 41, the OIS leaf spring 61, and the lens housing 52, and refers to a structure that provides a shake correction function. The camera module of the present invention may further include the AF lower spring 81, the AF coil 85, the bobbin 83, and the AF upper spring 87, for providing the autofocus function.

Figure 6:
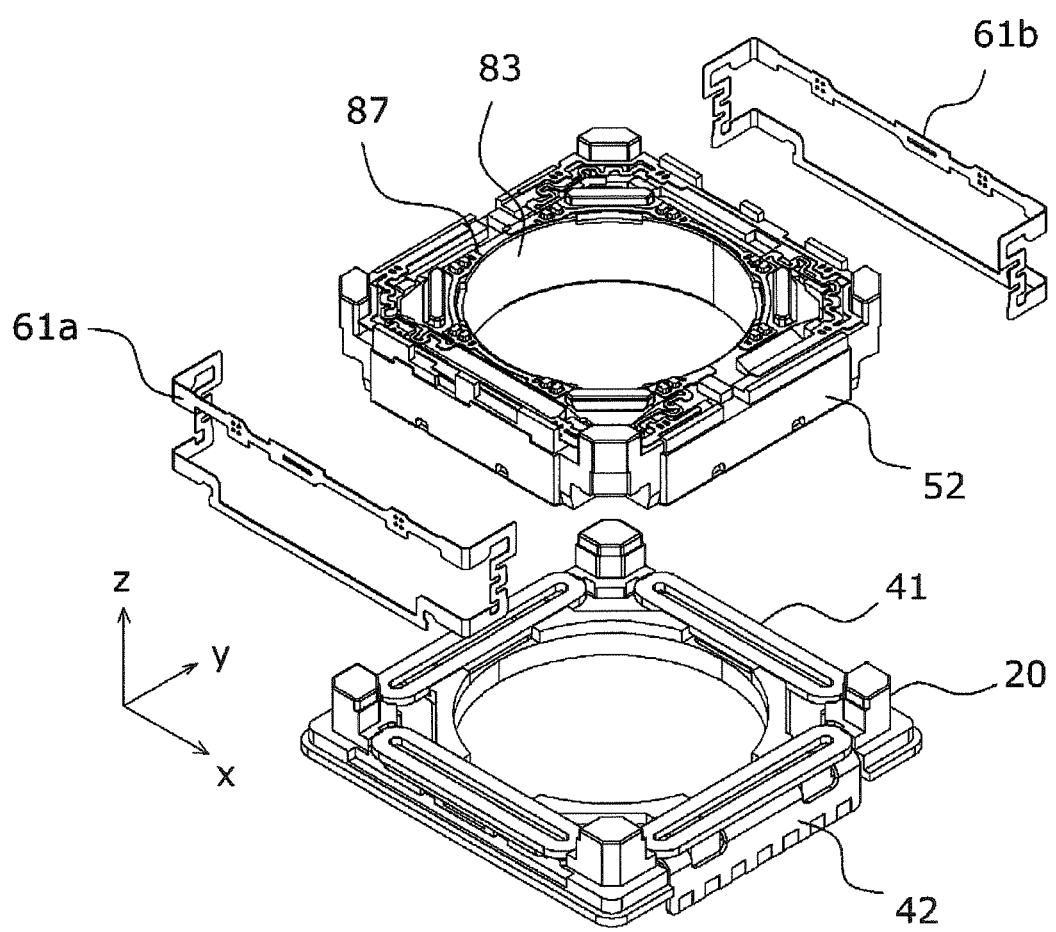
FIGS. 6, 7, and 8 are an exploded perspective view, an assembled perspective view, and an assembled front view showing a structure, in which a lens housing and a base housing are coupled to each other through an OIS leaf spring, as an OIS structure according to the present invention.
Figure 7:
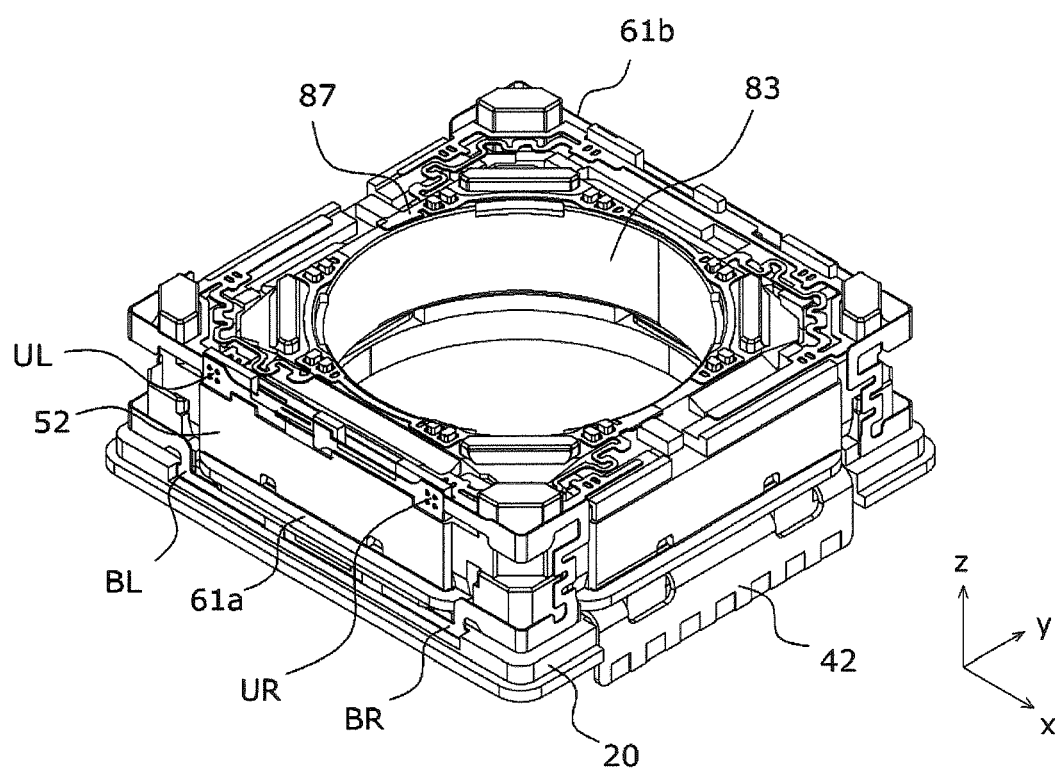
Figure 8:
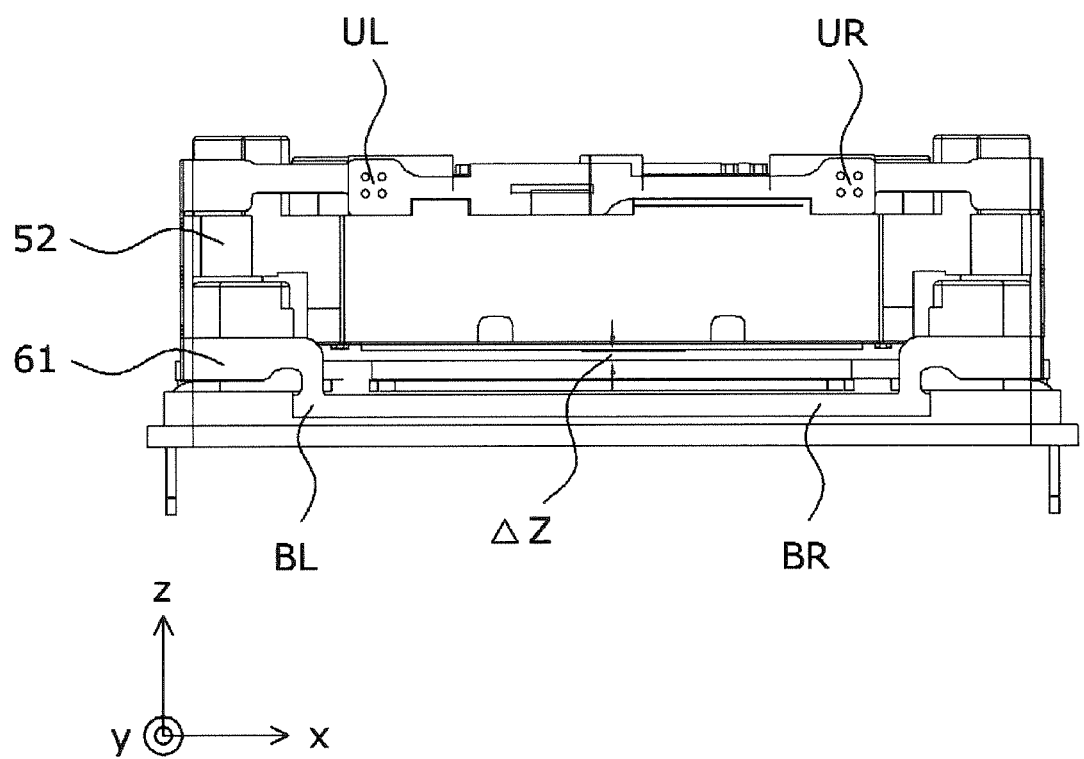

FIGS. 6, 7, and 8 are an exploded perspective view, an assembled perspective view, and an assembled front view showing a structure, in which the lens housing and the base housing are coupled to each other through the OIS leaf spring, as the OIS structure according to the present invention. The base housing 20 is provided with the OIS coil 41 and the flexible printed circuit board 42 therein; and in the lens housing 52, the magnet 43 is coupled to the AF lower spring 81, the AF coil 85, the bobbin 83, and the AF upper spring 87 providing the autofocus function. For convenience of description, based on the coordinate system shown in FIG. 6, a surface disposed in an x-direction is referred to as a front surface and a back surface, and a surface disposed in a y-direction is referred to as a side surface. By using two OIS leaf springs 61a and 61b, the base housing 20 and the lens housing are elastically coupled to each other. The first OIS leaf spring 61a is coupled to front surfaces of the base housing 20 and the lens housing 52 at a portion thereof. Of the first OIS leaf spring 61a, a portion provided on the front surfaces of the housings, and portions extending in parallel with left and right side surfaces of the housings after being bent constitute a free portion that is freely movable without restraint by the base housing 20 and the lens housing 52. Here, it is preferred that a bent angle is 90 degrees. The second OIS leaf spring 61b is coupled to back surfaces of the base housing 20 and the lens housing 52 through the same coupling structure as the first OIS leaf spring 61a. Since the second OIS leaf spring has the same coupling structure as the first OIS leaf spring, reference will be made only to the coupling structure of the first OIS leaf spring 61a, hereinafter. Since the lens housing 52 and the base housing 20 are coupled to each other by the OIS leaf springs 61a and 61b, as shown in FIG. 8, they are apart from each other by Δz (about 80 μm), whereby the lens housing 52 is allowed to move freely.

It is preferred that portions of the front surfaces and the back surfaces of the base housing 20 and the lens housing 52, which the first OIS leaf spring 61a and the second OIS leaf spring 61b are coupled to and are in close contact with, are provided with coupling grooves and/or coupling protrusions for allowing the leaf springs to be easily coupled to the housings. The first OIS leaf spring 61a is fixed to the lens housing 52 at a first upper bonding portion UL and a second upper bonding portion UR of the first OIS leaf spring by bonding using an adhesive, and is fixed to the base housing 20 at a first lower bonding portion BL and a second lower bonding portion BR of the first OIS leaf spring by bonding using the adhesive.

Figure 9:
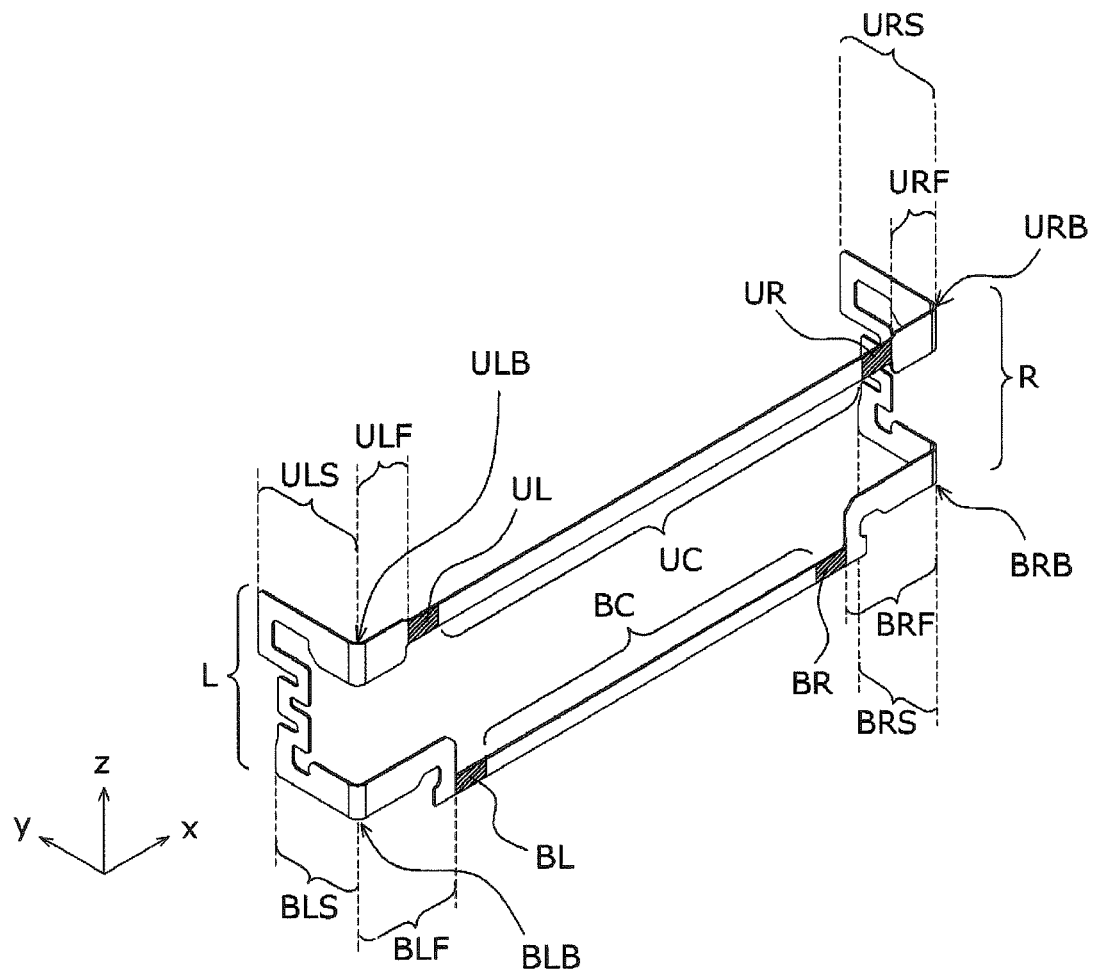
FIG. 9 is a perspective view showing an OIS leaf spring according to an embodiment of the present invention, which allows the base housing and the lens housing to be elastically coupled to each other.

FIG. 9 is a perspective view showing an OIS leaf spring according to an embodiment of the present invention, which allows the base housing and the lens housing to be elastically coupled to each other. The OIS leaf spring 61 includes: an upper coupling portion coupled to a front surface of the lens housing 52; a lower coupling portion coupled to a front surface of the base housing 20; a left free portion connecting a left end of the upper coupling portion with a left end of lower coupling portion; and a right free portion connecting a right end of the upper coupling portion with a right end of the lower coupling portion.

The upper coupling portion includes: the first upper bonding portion UL and the second upper bonding portion UR fixed to the lens housing 52 by the adhesive; and an upper contact portion UC connecting between the first upper bonding portion UL and the second upper bonding portion UR, and engaged with a coupling groove and/or a coupling protrusion formed in the front surface of the lens housing 52.

The lower coupling portion includes: the first lower bonding portion BL and the second lower bonding portion BR fixed to the base housing 20 by the adhesive; and a lower contact portion BC connecting between the first lower bonding portion BL and the second lower bonding portion BR, and engaged with a coupling groove and/or a coupling protrusion formed in the front surface of the base housing 20.

The left free portion includes: a left front portion ULF, BLF formed in parallel with the front surfaces of the lens housing 52 and the base housing 20; a left side portion ULS, BLS formed to be connected to the left front portion ULF, BLF, and to extend in parallel with left side surfaces of the lens housing 52 and the base housing 20 by being bent from a left bent portion ULB, BLB at an angle of 90 degrees; and a left vertical portion L. A geometric shape of the left free portion is configured as shown in FIG. 9, such that an upper left front portion ULF, an upper left side portion ULS, the left vertical portion L, a lower left side portion BLS, and a lower left front portion BLF are connected to one another.

The right free portion includes: a right front portion URF, BRF formed in parallel with the front surfaces of the lens housing 52 and the base housing 20; a right side portion URS, BRS formed to be connected to the right front portion URF, BRF, and to extend in parallel with left side surfaces of the lens housing 52 and the base housing 20 by being bent from a right bent portion URB, BRB at an angle of 90 degrees; and a right vertical portion R. A geometric shape of the right free portion is configured as shown in FIG. 9, such that an upper right front portion URF, an upper right side portion URS, the right vertical portion R, a lower right side portion BRS, and a lower right front portion BRF are connected to one another.

The left vertical portion L and the right vertical portion R are respectively provided with at least one bent portion so as to absorb a shock that is applied in a z-axis direction. The bent portion serves to absorb a shock that is applied in a vertical direction (in the z-axis direction) when a user drops a smartphone.

Assuming that the OIS leaf spring shown in FIG. 9 is the first OIS leaf spring 61a shown in FIG. 6, which is coupled to the front surfaces of the base housing and the lens housing, the second OIS leaf spring 61b having the same shape as the first OIS leaf spring is coupled to the back surfaces of the base housing and the lens housing at locations symmetrical based on a vertical virtual plane connecting vertical centers of the left surface and the right surface of the lens housing.

Figure 10:
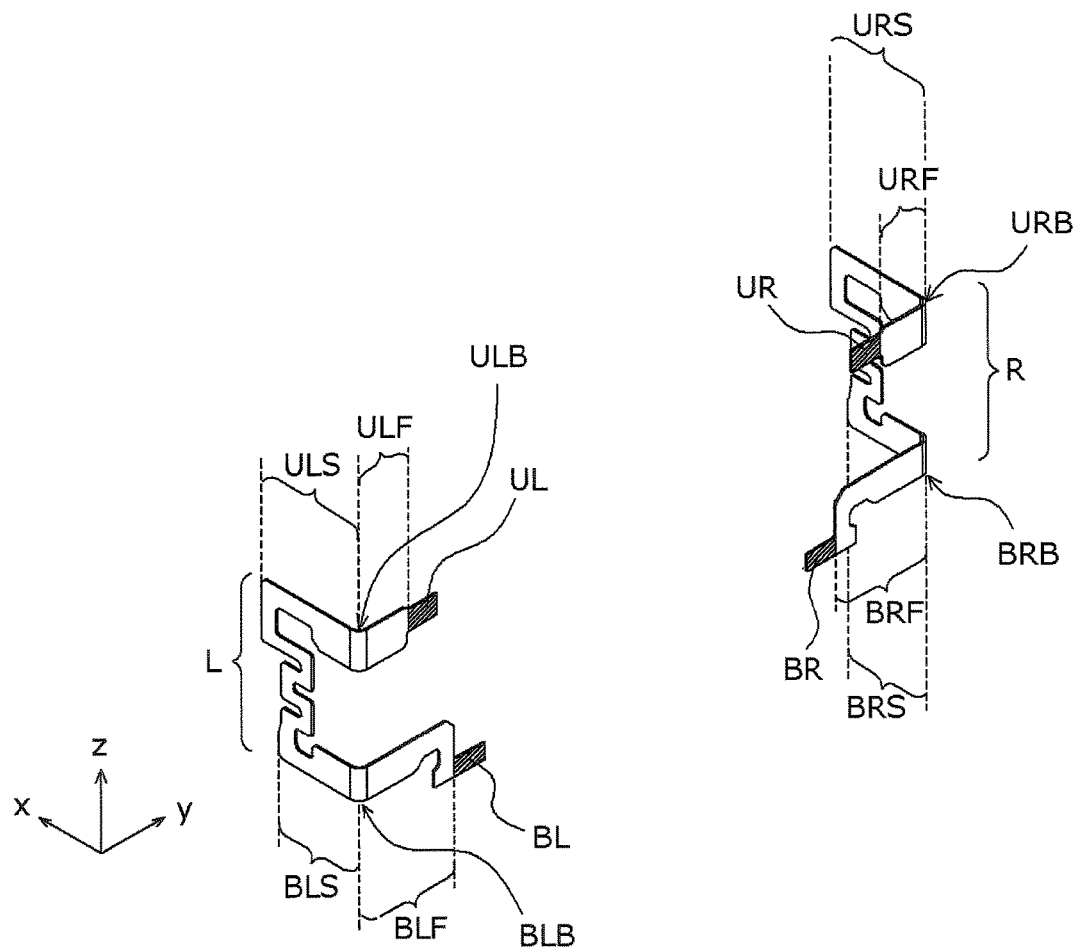
FIG. 10 is a perspective view showing an OIS leaf spring according to an embodiment of the present invention, which allows the base housing and the lens housing to be elastically coupled to each other.

FIG. 10 is a perspective view showing an OIS leaf spring according to an embodiment of the present invention, which allows the base housing and the lens housing to be elastically coupled to each other. The OIS leaf spring shown in FIG. 10 is different from the OIS leaf spring shown in FIG. 9 in that the one integrally formed leaf spring is divided into two leaf springs that work separately. When the OIS leaf spring shown in FIG. 10 is compared to the OIS leaf spring shown in FIG. 9, an assembly difficulty level of the OIS leaf spring shown in FIG. 10 is higher but provides the same function as the OIS leaf spring shown in FIG. 10. In the case of using the OIS leaf spring according to the embodiment of FIG. 9, the base housing 20 and the lens housing 52 may be elastically coupled to each other by using two OIS leaf springs; and in the case of using the OIS leaf spring according to the embodiment of FIG. 10, the base housing 20 and the lens housing 52 may be elastically coupled to each other by using four OIS leaf springs.

The upper coupling portion of the OIS leaf spring shown in FIG. 10, unlike the OIS leaf spring shown in FIG. 9, only includes the first upper bonding portion UL and the second upper bonding portion UR that are fixed to the lens housing 52 by the adhesive; and the lower coupling portion of the OIS leaf spring shown in FIG. 10, unlike the OIS leaf spring shown in FIG. 9, only includes the first lower bonding portion BL and the second lower bonding portion BR that are fixed to the base housing 20 by the adhesive.

The OIS leaf spring shown in a left view of FIG. 10 (hereinafter, referred to as 'third OIS leaf spring') is configured such that the free portion (or the left free portion) is constituted by one leaf spring that is formed by connecting the upper left front portion ULF, the upper left side portion ULS, the left vertical portion L, the lower left side portion BLS, and the lower left front portion BLF. Herein, the upper left front portion ULF and the lower left front portion BLF may be collectively referred to as the left front portion or the front portion; and the upper left side portion ULS the lower left side portion BLS may be collectively referred to as the left side portion or the side portion. The OIS leaf spring shown in a right view of FIG. 10 (hereinafter, referred to as 'fourth OIS leaf spring') is configured such that the free portion (or the right free portion) is constituted by one leaf spring that is formed by connecting the upper right front portion URF, the upper right side portion URS, the right vertical portion R, the lower right side portion BRS, and the lower right front portion BRF. Herein, the upper right front portion URF and the lower right front portion BRF may be collectively referred to as the right front portion or the front portion; and the upper right side portion URS and the lower right side portion BRS may be collectively referred to as the right side portion or the side portion.

Figure 11:
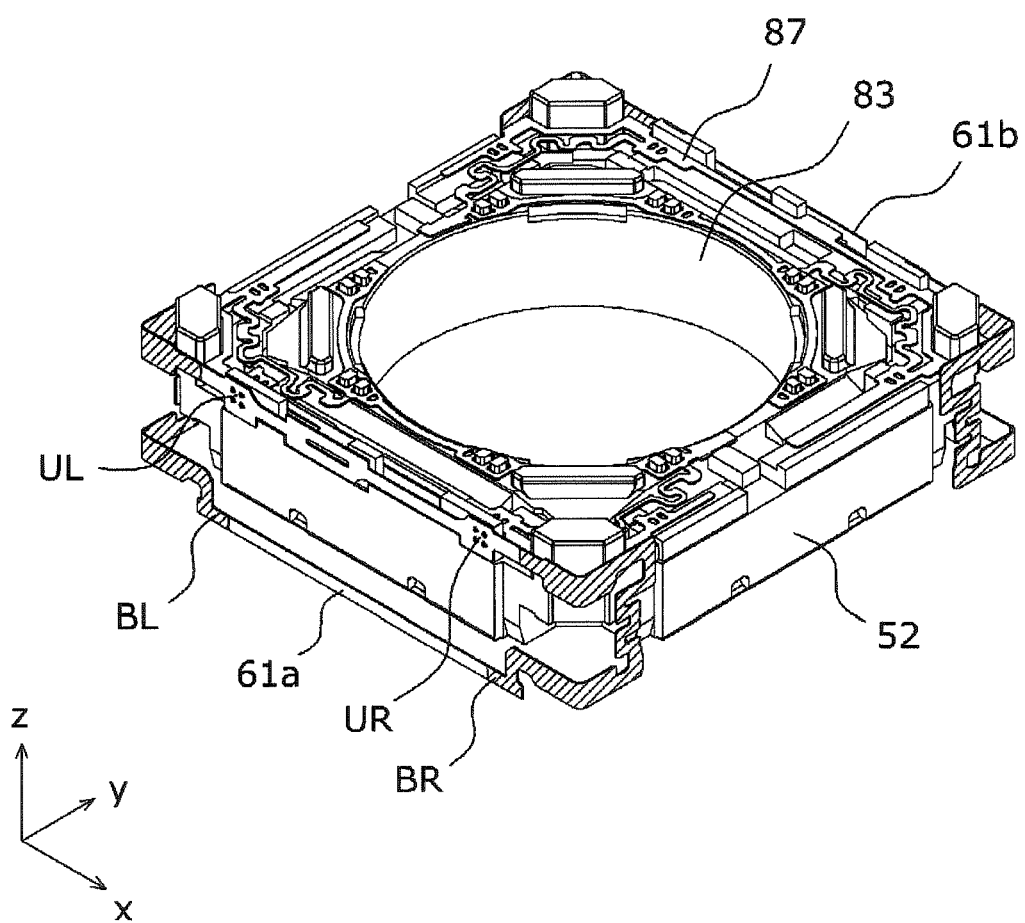
FIGS. 11 and 12 are a perspective view and a schematic plane view showing a state where the OIS leaf spring is coupled to the lens housing.
Figure 12:
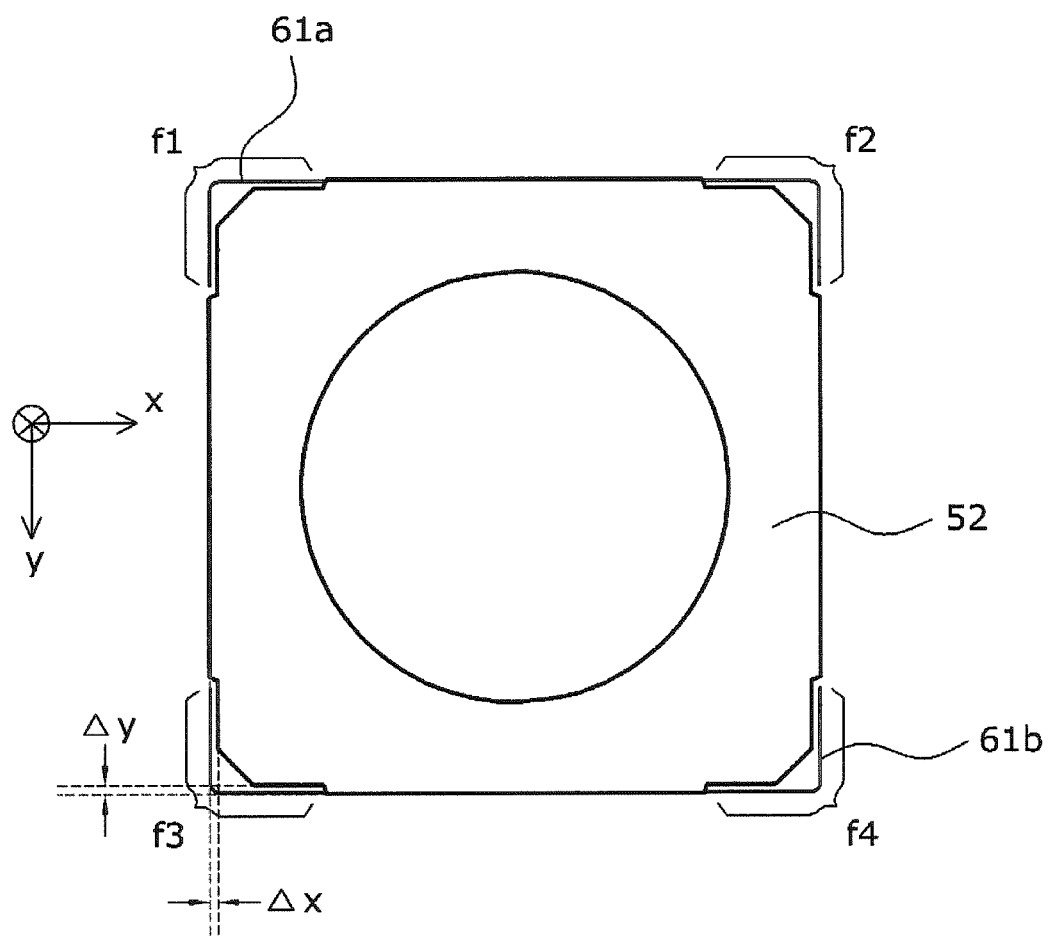

FIGS. 11 and 12 are a perspective view and a schematic plane view showing a state where the OIS leaf spring is coupled to the lens housing. In FIGS. 11 and 12, the base housing 20 is not shown for convenience of description. In particular, in FIG. 12, an inner configuration of the lens housing 52 is not shown, but an outer edge thereof is shown. In FIGS. 11 and 12, of portions constituting the leaf spring, the left free portion f1, f3 and the right free portion f2, f4, which are not coupled to the lens housing 52 and the base housing 20, are shown as a hatched area. An area constituting the left free portion f1, f3 and the right free portion f2, f4 of the OIS leaf spring used in the present invention includes: an area formed in parallel with the front surface of the lens housing 52; and an area formed to be connected to the above mentioned area, and bent at an angle of 90 degrees to be in parallel with neighboring side surface of the lens housing. Further, as shown in FIG. 12, the outer surface of the lens housing 52 corresponding to the area constituting the left free portion f1, f3 and the right free portion f2, f4 of the OIS leaf spring is configured to be formed inwardly stepwise toward a center of the lens housing by Δx and Δy, so as to be prevented from coming into contact with the OIS leaf springs 61a and 61b. Although the stepwise shape of the outer surface of the lens housing 52 is not shown in the drawings, the base housing 20 is also formed similar to the lens housing.

Figure 13:
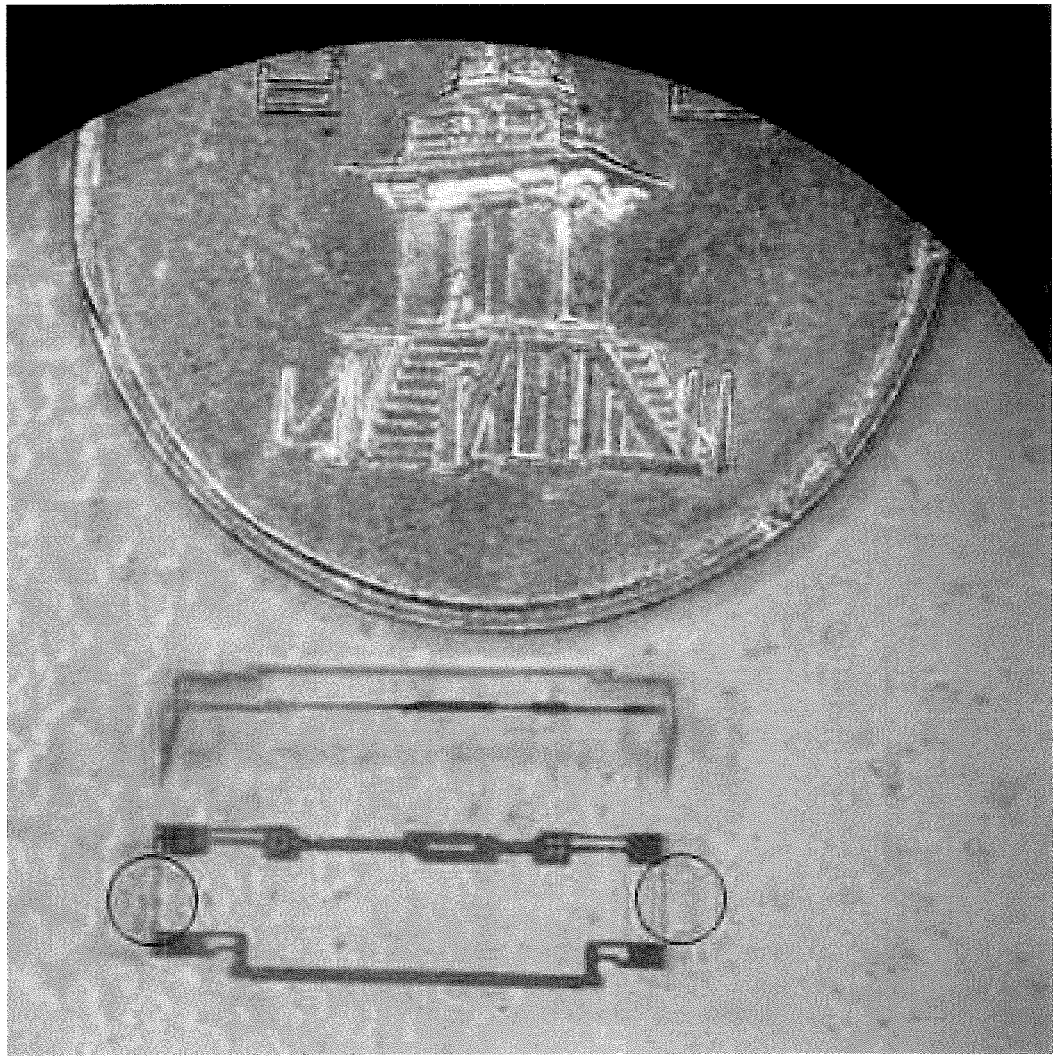
FIG. 13 is a photograph image showing a state where two OIS leaf springs manufactured according to the present invention are disposed under a 10 Korean won coin with different angles.

FIG. 13 is a photograph image showing a state where two OIS leaf springs manufactured according to the present invention are disposed under a 10 Korean won coin with different angles. Of the two OIS leaf springs, areas of the lower leaf spring in the circles a thickness of the leaf spring constituting the vertical portion connecting between the housing and the optical system, and the areas may be an element corresponding to a conventional suspension wire (or a wire spring). In other words, a conventional technology uses a thin suspension wire (or a wire spring) shown in the red circles, but the wire is so thin that it is difficult for a worker to assemble the wire by hand.

When camera shake occurs during photographing, the optical system elastically coupled to the housing moves, and accordingly, the optical system is controlled to move in a direction opposite to the camera shake.

Figure 14:
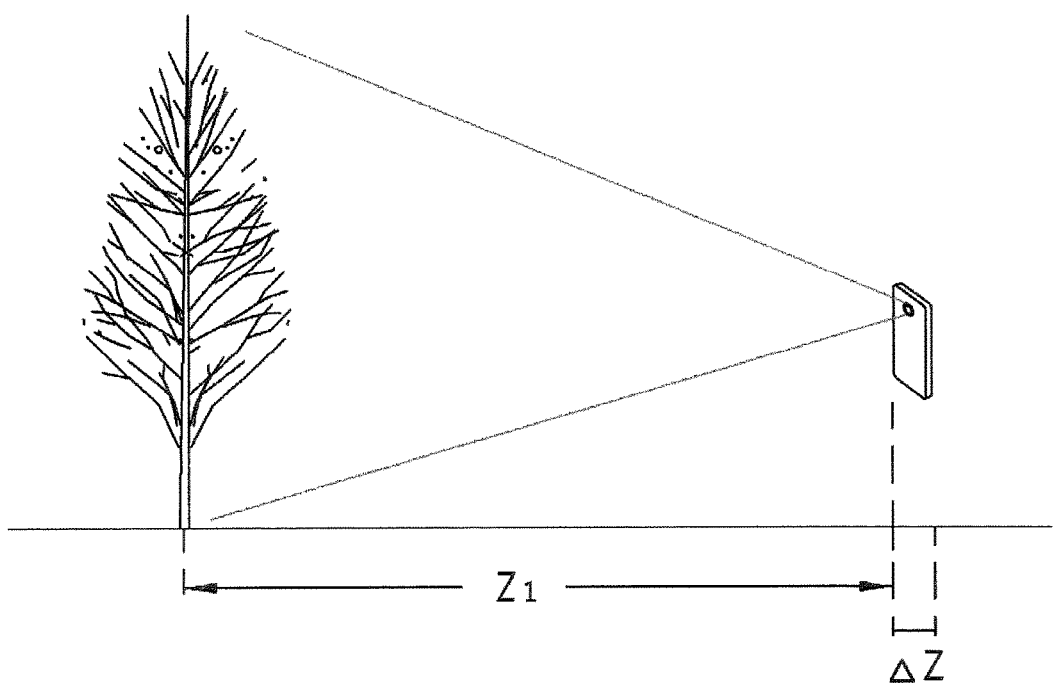
FIG. 14 is a schematic view showing a direction requiring movement compensation when a subject is photographed using a smartphone.

In controlling the movement, assuming that a distance-direction between a subject and a smartphone is a z-axis (a direction connecting between the base housing and the lens housing), unless it is a close-up shot for a very close subject, as shown in FIG. 14, a moving distance ΔZ of the lens housing in the z-axis direction is shorter than a distance Z1 between the subject and the smartphone, and accordingly, compensation for the z-axis direction is meaningless.

On the contrary, when the optical system moves in an x-axis direction and/or a y-axis direction by camera shake, it may cause an effect on an image, so compensation therefor is required. However, a displacement sensor provided in the smartphone for sensing movements by the camera shake is conventionally configured such that as shown in FIG. 5, movements in the x-axis direction and the y-axis direction are respectively measured by using two displacement sensors. Accordingly, in the case of compensating for the movement caused by camera shake, it is preferred that movement compensation is performed respectively in the x-axis direction and the y-axis direction.

Figure 15:
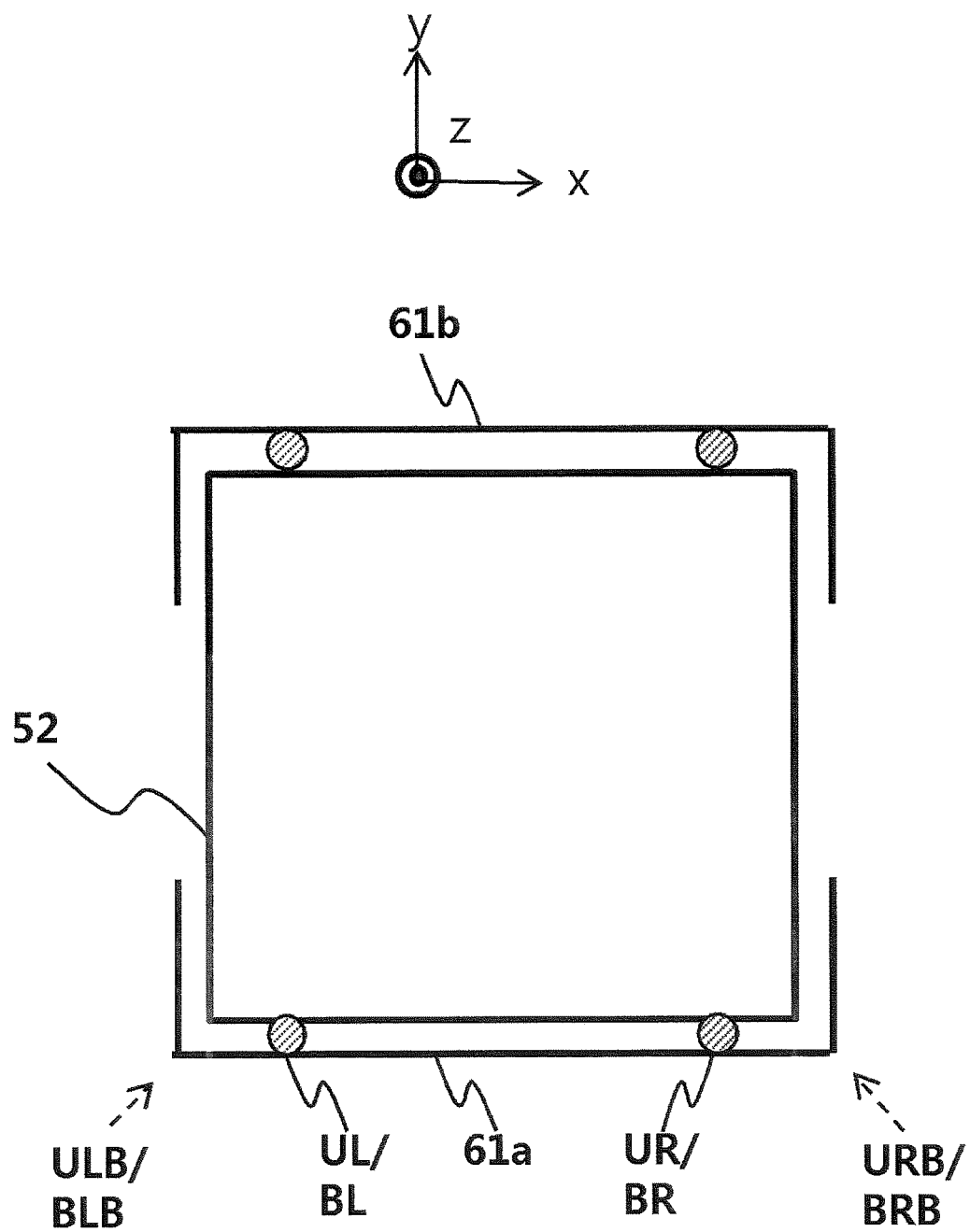
FIG. 15 is a schematic plane view from a top of the optical system, the view showing a coupling relation between the lens housing and the leaf spring.

FIG. 15 is a schematic plane view from a top of the optical system, the view showing a coupling relation between the lens housing and the leaf spring. The present invention is provided with bent portions ULB, BLB, URB, and BRB formed by the leaf spring being bent across two surfaces, whereby the bent portions serve as a fixed point. Accordingly, the leaf spring used in the present invention is capable of separately controlling respective movement amounts in the x-axis direction and the y-axis direction. For example, when it is intended that compensation is performed in the x-axis direction by Δx, and in the y-axis direction by Δy, movements are separately controlled in the x-direction and the y-direction.

Since the leaf springs 61a and 61b are separately controlled in the respective side portion direction and front portion direction, assuming that modulus of elasticity of the x-direction and the y-direction is Kx and Ky, respectively, Kx and Ky may be designed to have different modulus of elasticity. Of course, Kx and Ky may be designed to have the same modulus of elasticity for convenience of design.

Figure 16:
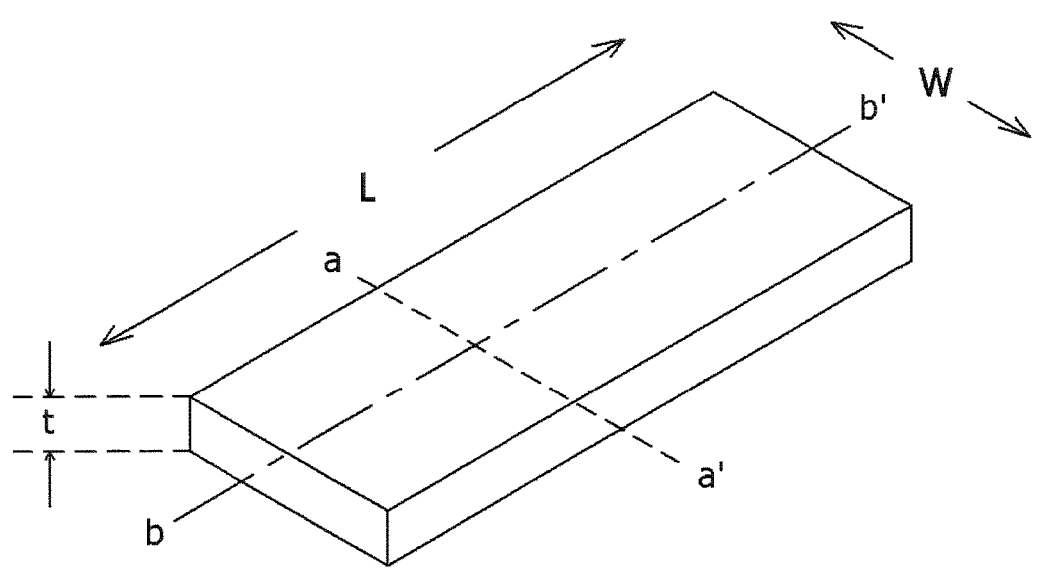
FIG. 16 is a perspective view showing the leaf spring.

FIG. 16 is a perspective view showing a general leaf spring. The leaf spring shown in FIG. 16 has a length of 'L', a width of 'W', and a thickness of 't'. The leaf spring is processed as following: a circular plate having a thickness of 't' is formed and cut to be in a desired shape by rolling, and then the cut leaf spring is bent to be in a desired shape. However, a bent direction is set since bending the leaf spring has a lot to do with a rolling direction of the circular plate. For example, if the leaf spring has a good bending property toward a bottom along line a-a' of FIG. 16, it may be difficult to bend the leaf spring toward the bottom along line b-b'. Further, as shown in FIGS. 9 and 10, the OIS leaf spring according to the present invention is configured such that widths of the bent portions (the upper left bent portion, the lower left bent portion, the upper right bent portion, and the lower right bent portion) are wider than those of the bonding portions (the first upper bonding portion, the first lower bonding portion, the second upper bonding portion, and the second lower bonding portion). That is because stress generated from the bent portion is larger than that generated from the bonding portion. In other words, that is why stress generated when bending the leaf spring is well distributed if the width of the leaf spring is larger. Further, since the wider the width of the bonding portion is, the larger the spring constant is, and more electromagnetic force should be applied, whereby it is disadvantageous to controlling OIS. Accordingly, it is preferred that in the OIS leaf spring, the widths of the bonding portions are maintained to be narrower than those of the bent portions. Lastly, the OIS leaf spring according to the present invention is provided such that a virtual direction through a thickness direction corresponds to surface vectors of the front surfaces and the side surfaces of the base housing and the lens housing.

While a preferred embodiment of the invention has been described using specific terms, such description is for illustrative purposes only, and it is to be understood that changes and variations may be made without departing from the spirit or scope of the following claims. Accordingly, any and all modifications, variations or equivalent arrangements which may occur to those skilled in the art should be considered to be within the scope of the invention.

What is claimed is:

1. An optical image stabilization (OIS) structure comprising:
    a base housing provided with an OIS coil and including a front base housing surface, a left side base housing surface, a right side base housing surface and a back base house surface;
    a lens housing disposed over the base housing to be apart therefrom and including a front lens housing surface, a left side lens housing surface, a right side lens housing surface and a back lens house surface; and
    an OIS leaf spring for allowing the base housing and the lens housing to be elastically coupled to each other, wherein
    the OIS leaf spring includes: an upper coupling portion coupled to the front lens housing surface of the lens housing; a lower coupling portion coupled to the front base housing surface of the base housing; and a free portion provided by extending from the upper coupling portion to the lower coupling portion without being contact with the base housing and the lens housing, wherein
    the free portion includes: a front portion provided in parallel with the front lens housing surfaces of the lens housing and the front base housing surface of the base housing; and a side portion provided by being bent from the front lens housing surface of the lens housing so as to extend in parallel with one of the left and right side lens housing surfaces of the lens housing and one of the left and right base housing surfaces of the base housing.

2. The OIS structure of claim 1, wherein
the front portion includes: an upper front portion provided in parallel with the front lens housing surface of the lens housing; and a lower front portion provided apart from the upper front portion, and being in parallel with the front base housing surface of the base housing;
the side portion includes: an upper side portion connected to the upper front portion, and being in parallel with the left and right side lens housing surfaces of the lens housing; and a lower side portion spaced apart from the upper front portion, connected to the lower front portion, and being in parallel with one of the left and right side base housing surfaces of the base housing; and
the free portion further includes a vertical portion connecting the upper side portion with the lower side portion.

3. The OIS structure of claim 2, wherein
the vertical portion is provided with at least one bent portion.

4. The OIS structure of claim 2, wherein
the upper coupling portion includes a first upper bonding portion fixed to the lens housing by an adhesive; and
the lower coupling portion includes a first lower bonding portion fixed to the base housing by an adhesive.

5. The OIS structure of claim 3, wherein
the upper coupling portion includes a first upper bonding portion fixed to the lens housing by an adhesive; and
the lower coupling portion includes a first lower bonding portion fixed to the base housing by an adhesive.

6. The OIS structure of claim 2, wherein
the upper coupling portion includes: a first upper bonding portion and a second upper bonding portion fixed to the lens housing by an adhesive; and an upper contact portion connecting between the first upper bonding portion and the second upper bonding portion, and coupled to the front lens housing surface of the lens housing; and
the lower coupling portion includes: a first lower bonding portion and a second lower bonding portion fixed to the base housing by an adhesive; and a lower contact portion connecting between the first lower bonding portion and the second lower bonding portion, and coupled to the front base housing surface of the base housing, wherein
the first upper bonding portion and the second upper bonding portion are respectively provided on left and right sides based on a center of the front lens housing surface of the lens housing; and
the first lower bonding portion and the second lower bonding portion are respectively provided on left and right sides based on a center of the front base housing surface of the base housing.

7. The OIS structure of claim 3, wherein
the upper coupling portion includes: a first upper bonding portion and a second upper bonding portion fixed to the lens housing by an adhesive; and an upper contact portion connecting between the first upper bonding portion and the second upper bonding portion, and coupled to the front lens housing surface of the lens housing; and
the lower coupling portion includes: a first lower bonding portion and a second lower bonding portion fixed to the base housing by an adhesive; and a lower contact portion connecting between the first lower bonding portion and the second lower bonding portion, and coupled to the front base housing surface of the base housing, wherein the first upper bonding portion and the second upper bonding portion are respectively provided on left and right sides based on a center of the front lens housing surface of the lens housing; and the first lower bonding portion and the second lower bonding portion are respectively provided on left and right sides based on a center of the front base housing surface of the base housing.

8. The OIS structure of claim 7, wherein
the front lens housing surface of the lens housing includes a first coupling protrusion coupled to the upper contact portion; and the front base housing surface of the base housing includes a second coupling protrusion coupled to the lower contact portion.

9. The OIS structure of claim 2, wherein
the front lens housing surfaces, left side lens housing surface and right side lens housing surfaces of the lens housing, and the front base housing surface, left side base housing surface and right side base housing surface of the base housing, to which the free portion is disposed, are configured to be inwardly stepwise toward centers of the lens housing and the base housing.

10. The OIS structure of claim 2, wherein
a width of a bent portion of the leaf spring is configured to be wider than widths of the upper coupling portion and the lower coupling portion of the leaf spring.

11. A camera module comprising:
an image sensor;
a lens barrel; and
the OIS structure of claim 9.

12. An optical image stabilization (OIS) structure comprising:
a base housing provided with an OIS coil and including a front base housing surface, a left side base housing surface, a right side base housing surface and a back base house surface;
a lens housing disposed over the base housing to be apart therefrom and including a front lens housing surface, a left side lens housing surface, a right side lens housing surface and a back lens house surface;
a first OIS leaf spring elastically coupled to the front base housing surfaces of the base housing and the front lens housing surface of the lens housing; and
a second OIS leaf spring elastically coupled to the back base housing surfaces of the base housing and the back lens housing surface of the lens housing, wherein
the first OIS leaf spring includes: an upper coupling portion coupled to the front lens housing surface of the lens housing; a lower coupling portion coupled to the front base housing surface of the base housing; and a free portion provided by extending from the upper coupling portion to the lower coupling portion without being contact with the base housing and the lens housing, wherein
the free portion includes: a front portion provided in parallel with the front lens housing surfaces of the lens housing and the front base housing surface of the base housing; and a side portion provided by being bent from the front lens housing surface of the lens housing so as to extend in parallel with one of the left and right side lens housing surfaces of the lens housing and one of the left and right side base housing surfaces of the base housing.

13. The OIS structure of claim 12, wherein
the front portion includes: an upper front portion provided in parallel with the front lens housing surface of the lens housing; and a lower front portion provided apart from the upper front portion, and being in parallel with front base housing surface of the base housing;
the side portion includes: an upper side portion connected to the upper front portion, and being in parallel with one of the left and right side lens housing surfaces of the lens housing; and
a lower side portion spaced apart from the upper front portion, connected to the lower front portion, and being in parallel with one of the left and right side base housing surfaces of the base housing; and
the free portion further includes a vertical portion connecting the upper side portion with the lower side portion.

14. The OIS structure of claim 13, wherein
the vertical portion is provided with at least one bent portion.

15. The OIS structure of claim 13, wherein
the second OIS leaf spring is arranged to be symmetrical based on a vertical virtual plane connecting vertical centers of the left side lens housing surface and the right side lens housing surface of the lens housing.

16. The OIS structure of claim 14, wherein
the second OIS leaf spring is arranged to be symmetrical based on a vertical virtual plane connecting vertical centers of the left side lens housing surface and the right side lens housing surface of the lens housing.

17. The OIS structure of claim 15, wherein
the front lens housing surfaces, left side lens housing surface and right side lens housing surfaces of the lens housing, and the front base housing surface, left side base housing surface and right side base housing surface of the base housing, to which the free portion is disposed, are configured to be inwardly stepwise toward centers of the lens housing and the base housing.

18. The OIS structure of claim 16, wherein
the front lens housing surfaces, left side lens housing surface and right side lens housing surfaces of the lens housing, and the front base housing surface, left side base housing surface and right side base housing surface of the base housing, to which the free portion is disposed, are configured to be inwardly stepwise toward centers of the lens housing and the base housing.

19. The OIS structure of claim 12, wherein
a width of a bent portion of the leaf spring is configured to be wider than widths of the upper coupling portion and the lower coupling portion of the leaf spring.

20. The OIS structure of claim 13, wherein
a width of a bent portion of the leaf spring is configured to be wider than widths of the upper coupling portion and the lower coupling portion of the leaf spring.

* * * * *